United States Patent [19]

Hatter

[11] Patent Number: 5,117,667
[45] Date of Patent: Jun. 2, 1992

[54] THREADED STRUCTURAL FASTENER WITH THREAD LOCK AND METHOD FOR MAKING IT

[75] Inventor: Edwin E. Hatter, Torrance, Calif.

[73] Assignee: Hi-Shear Corporation, Torrance, Calif.

[21] Appl. No.: 248,534

[22] Filed: Sep. 23, 1988

Related U.S. Application Data

[62] Division of Ser. No. 734,858, May 15, 1985, abandoned.

[51] Int. Cl.⁵ .................... B21D 17/04; B21H 3/02
[52] U.S. Cl. ............................................. 72/88; 470/11
[58] Field of Search ................ 10/10 R, 27 R; 72/88, 72/90, 469; 411/311, 336

[56] References Cited

U.S. PATENT DOCUMENTS

| 631,159 | 8/1899 | Echols | 72/104 |
|---|---|---|---|
| 1,508,316 | 9/1924 | Brune | 411/281 |
| 2,161,610 | 6/1939 | Boggild | 72/90 |
| 2,293,930 | 8/1942 | Braendel | 72/88 X |
| 2,352,668 | 7/1944 | Tripp | 411/281 |
| 2,484,644 | 10/1949 | Poupitch | 411/311 |
| 2,484,645 | 10/1949 | Baumle | 411/311 |
| 2,827,313 | 3/1958 | Conner . | |
| 3,233,318 | 2/1966 | Neuschotz | 411/334 |
| 3,280,872 | 10/1966 | Neuscholtz | 411/333 |
| 3,339,389 | 9/1967 | Mosow | 411/334 |
| 3,371,572 | 3/1968 | King, Jr. | 411/361 |
| 3,421,562 | 1/1969 | Orloff et al. | 411/336 |
| 3,464,472 | 9/1969 | Reynolds | 411/336 |
| 3,517,717 | 6/1970 | Orlomoski | 411/311 |
| 3,643,722 | 2/1972 | Oestereicner | 411/334 |
| 3,850,215 | 11/1974 | Orlomoski | 72/88 X |
| 4,601,623 | 7/1986 | Wallace | 411/336 |

FOREIGN PATENT DOCUMENTS

| 683295 | 3/1964 | Canada | 411/43 |
|---|---|---|---|
| 71848 | 11/1893 | Fed. Rep. of Germany | 411/411 |

Primary Examiner—Lowell A. Larson
Assistant Examiner—Michael J. McKeon
Attorney, Agent, or Firm—Donald D. Mon

[57] ABSTRACT

A fastener which includes a threaded pin having a notched helical thread to receive a threaded collar which, after being set to a torque, is deformed to move material into some notches on the thread to form a lock to prevent unthreading. The notched thread can be formed by a three-section roll die, the first section of which forms the thread, the second of which notches the thread, and the third section of which smoothes the thread. The invention comprehends the die, the die forming method, the pin, the pin and collar, and a joint formed with the pin and collar.

3 Claims, 1 Drawing Sheet

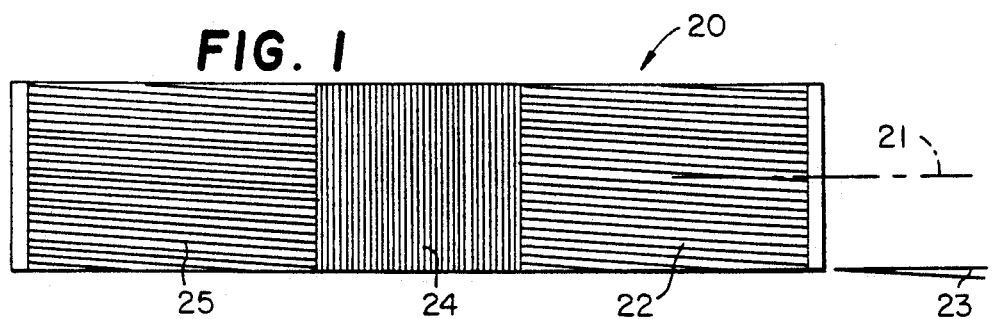
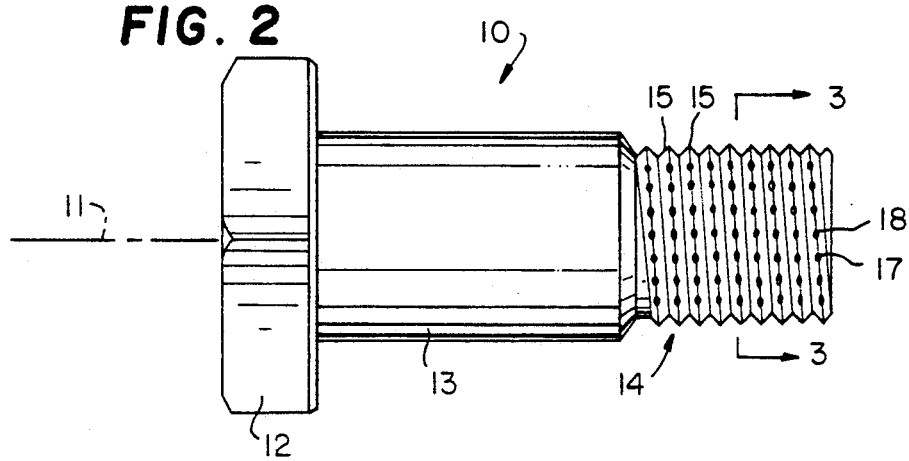
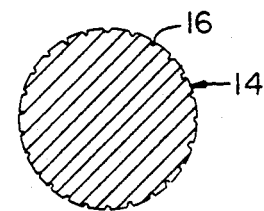
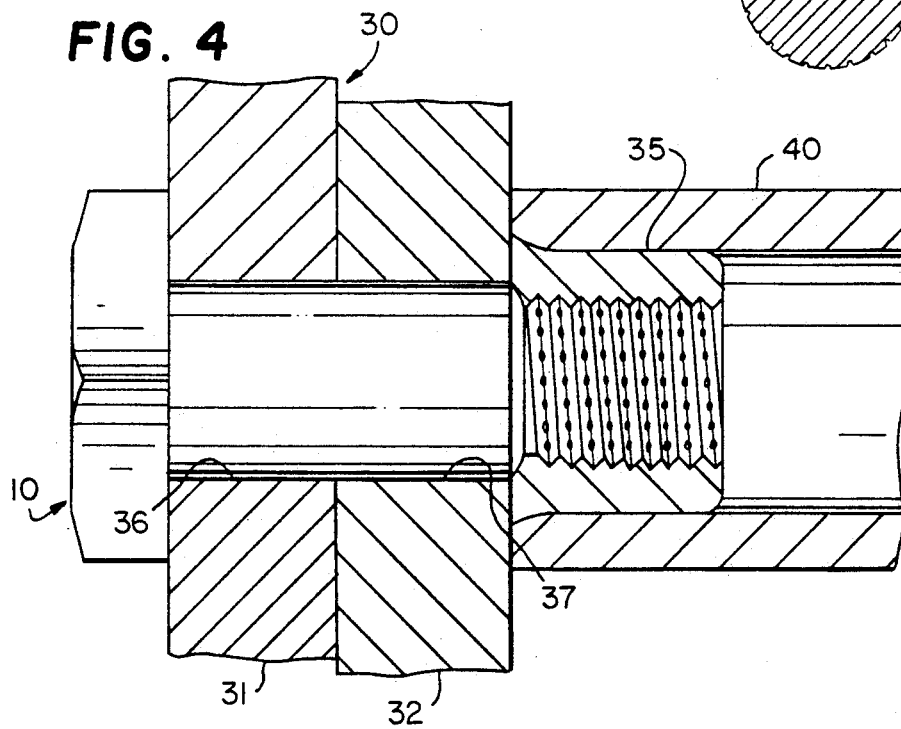

THREADED STRUCTURAL FASTENER WITH THREAD LOCK AND METHOD FOR MAKING IT

CROSS-REFERENCE TO OTHER APPLICATION

This is a division of applicant's co-pending patent application Ser. No. 734,858, filed May 15, 1985, now abandoned.

FIELD OF THE INVENTION

This invention relates to threaded structural fasteners which can be locked against unthreading.

BACKGROUND OF THE INVENTION

Threaded fasteners are widely used to form structural joints. The classical bolt-and-nut (pin-and-collar) construction is set by tightening the collar onto the pin to a predetermined torque. At least in theory, the torque is supposed to generate a desired axial tension (pre-load) in the joint. This axial tension represents the "tightness" of the joint, a feature which has much to do with the reliability and longevity of the joint.

A requirement for a reliable threaded joint is that it be locked against unthreading so it does maintain that torque and that axial tension. Numerous solutions have been suggested for this objective, such as lock washers, collars pressed out of round so they exert a retentive spring back force on the pin, and non-round threads onto which the collar is pressed after it is tightened.

Systems such as those which use lock washers involve additional weight and complexity, and for these reasons are undesirable. Collars initially pressed out of round exert a drag when the collar is tightened, which can confuse the level of torque and of the axial pre-load which actually occurs in the fastener when tightened. Known non-round threads must be specially machined (tri-lobular threads, for example), and cannot be formed by simple thread colling techniques. In addition, their locking action is sometimes uniquely dependent on the angular relationship of the pin and the collar when the collar is tightened down. This can lead to undesirable uncertainties of locking action and of axial preload.

It is an object of this invention to provide a pin, a pin and collar combination, and a joint which includes this combination, in which a collar is provided that can freely be turned and tightened onto a threaded pin to a desired torque without drag, and which can then be locked in place without dependence on angular relationships, and without disturbing the torque level or the axial pre-load.

BRIEF DESCRIPTION OF THE INVENTION

A pin for use in combination with the collar, and with the collar to form a joint with workpieces has a head, a cylindrical axial shank, and a thread in that order. The thread is helical and has a crest. The crest has a plurality of notches to receive displaced material of a collar that is threaded to it. After being set to a predetermined torque, the collar will be compressed, such as by swaging, to displace material of the collar into the notches to form a physical lock against unthreading. However, notching the thread removes material which is useful in forming the threaded joinder, and it is necessary to avoid notching to the extent which would result in a structure which is improperly weakened.

According to a feature of the invention, the notches occur in a series through at least one full convolution of the thread, and do not extend into the male thread below the pitch diameter.

According to preferred but optional features of the invention, the notches are formed in axially arranged sets, and have relatively sharp edges.

According to yet another preferred but optional feature of the invention, the notched thread is preferably formed by a thread rolling operation utilizing a roll die which has a first set of die-forming grooves disposed at an angle suitable to roll a thread, a second set of notch-forming grooves disposed at an angle to said first set to form the notches, and a third set of smoothing grooves generally aligned with the first set which are adapted to enter a thread formed by the first set and smooth the thread to remove irregularities from the bearing surfaces of the thread which were created by the notching operation.

The above and other features of this invention will be fully understood from the following detailed description and the accompanying drawings, in which:

FIG. 1 is a plan view for a roll die for forming the notched thread of this invention;

FIG. 2 is a side view of a pin whose thread has been formed by the die of FIG. 1;

FIG. 3 is a cross-section taken at line 3—3 in FIG. 2; and

FIG. 4 shows the process of finally locking the set fastener, and also shows a joint that includes the set fastener.

DETAILED DESCRIPTION OF THE INVENTION

The presently preferred pin 10 of this invention is shown in FIG. 2. It has a central axis 11. It is a unitary body having a head 12, an axial cylindrical shank 13, and a thread 14 in that order.

Thread 14 is a conventional helical thread which includes a helical crest 15 forming a plurality of convolutions. In this crest there is formed a plurality of notches 16. These notches comprise indentations in the crest that are spaced apart from one another along the crest. Preferably they extend as a sequence around at least one full thread convolution. When they extend around more than one convolution, it is convenient for these notches to be formed in sets such as sets 17, 18 in which notches of successive convolutions are axially aligned with one another. There are many such sets in the device of FIG. 2.

The thread shown in FIG. 2 is most conveniently formed by the roll die 20 shown in FIG. 1. This roll die is a flat plate to be set into a die holder in accordance with known thread rolling techniques. It is forced against a cylindrical shank to change its shape in accordance with the shape of the die surface to roll a thread. It will be understood that the relative movement between the shank and the die is in the direction which would cause the die to move along axis 21 in FIG. 1. Thread rolling techniques are well-known and require no detailed discussion here. Suffice it to say that a first set of grooves 22 having the desired shape of the thread to be rolled is formed on the surface of the die. These grooves are disposed at an angle 23 with axis 21. This angle is such that the relative movement of the die and of the thread will cause a thread of proper pitch to be formed.

Immediately adjacent to the first set of grooves there is a second set of grooves 24 that are disposed at an angle to the first set. Preferably they extend normal to axis 21 so as to form sets 17, 18 of notches described above whose members are disposed along a line which is parallel to the axis of the pin. The crests of grooves 24, when pressed into the crest of the rolled thread, notch the thread by displacing material at the crest of the thread. A third set of grooves 25 at the same angle 23 to axis 21, and with a shape similar to that of grooves 22, is placed adjacent to grooves 24. Their crest and faces will engage the existing thread and smooth out the irregularities caused by displacement of metal during the notching operation.

The use of the pin is shown in FIG. 4, where a joint 30 comprising a pair of workpieces 31, 32, is shown being held assembled by a pin 10 on which a collar 35 has been set. The head bears against one of the workpieces. The shank fits in holes 36, 37 in the workpieces. The thread on the pin projects beyond the workpieces. The collar engages the thread outside of the workpieces.

The collar may be such as a conventional hexagonal nut torqued to a given level, a regularly or irregularly shaped round internally threaded collar, or a torque-limited collar such as the well-known Hi-Lok collar shown in U.S. Pat. No. 2,940,495, which patent is incorporated herein its entirety by reference.

Whatever the kind of threaded collar, the collar is freely spun onto the pin, set to the desired level of torque, and then locked in place by inwardly swaging all or some part of the external surface of the collar, so that some of the material of the inside wall of the threaded part of the collar, enters at least some of the notches. A physical lock is thereby made.

Simplified tooling is shown in FIG. 4, wherein a bellmouthed swaging tool 400 is axially pressed along the outside surface of the collar to press the collar into the notches. Alternatively, ball-crimping means might be utilized which thrusts balls against the outside surface. Then the tool can be spun to swage in a band of material. Any desired swaging or pressing means may be utilized so long as forces are transmitted to the inside thread of the collar to displace part of it into the notches, thereby forming a physical lock against unthreading, and the axial preload is not materially changed by it.

The dimensions of the notches is of considerable importance to this invention. In a properly formed threaded joint, about 85% of the load is carried by that portion of the male thread which lies radially inward of the pitch diameter. It follows that removal of metal radially outward of the pitch diameter has only a minor effect on the strength of the threaded joinder, which can be anticipated in the structural designer. Also, only a portion of the convolution outside of the pitch diameter is removed, so a considerable portion of it remains to be engaged by the thread in the collar.

For best locking action, the edges of the notch should be sharp, rather than rounded. Such notches can readily be formed with the rolling process as described. The first die section forms a conventional thread. The second die section notches this thread, and displaces relatively minor volumes of metal. The third die section readily redistributes this minor amount of metal without appreciably rounding off the sharp rolled edges of the notches.

This invention is not to be limited by the embodiments shown in the drawings and described in the description which are given by way of example and not of limitation, but only in accordance with the scope of the appended claims.

I claim:

1. A method for forming a notched thread on a cylindrical pin comprising, utilizing a roll die having a thread-forming first section, a notch forming second section, and a smoothing third section, said method comprising rolling said die forcibly against said pin, first to form a thread with said thread-forming first section, second to form notches in the crest of said thread by said notch forming second section, and third to smooth the said notched thread by said smoothing third section, said first section producing a thread which is helical having a pair of faces that form a crest with a pitch diameter, said second section forming said notches to a depth no deeper than the pitch diameter, and the third section smoothing surface irregularities caused by displacement of metal.

2. A method according to claim 1 in which said first and third sections comprises grooves which are all parallel to one another, and which make an angle with the axis of the thread, the second section having parallel grooves which make an angle with said first grooves.

3. A die for forming a rolled notched thread comprising a plate having a first set of thread forming grooves with intervening ridges disposed at an angle suitable to roll a helical thread with a pair of faces, a crest and a pitch diameter, a second set of notch-forming grooves with intervening ridges disposed at an angle to said first set, said ridges of said second section being so proportioned and arranged as to notch said thread with notches no deeper than said pitch diameter, and a third set of smoothing grooves with intervening ridges generally aligned with said first set, adapted to engage and smooth a thread formed by said first set and notched by said second set.

* * * * *